April 28, 1970 G. E. HOLZ 3,509,421

PLASMA GAS-FILLED DISPLAY DEVICE

Filed Sept. 11, 1967

INVENTOR.
GEORGE E. HOLZ

BY

Robert A. Green 3,509,421

PLASMA GAS-FILLED DISPLAY DEVICE

George E. Holz, North Plainfield, N.J., assignor to Burroughs Corporation, Detroit, Mich., a corporation of Michigan Filed Sept. 11, 1967, Ser. No. 666,828
Int. Cl. H05b *41/00*
U.S. Cl. 315—150 6 Claims

ABSTRACT OF THE DISCLOSURE

The disclosure is of a display device comprising a plurality of gas-filled, light-producing cells positioned so that they can react with each other by means of ultraviolet radiation generated by them when they fire.

BACKGROUND OF THE INVENTION

One-type of known gas-filled, light-producing cell comprises a glass envelope which contains an ionizable gas and having electrodes secured to the envelope so that energizing potentials can be applied across the volume of gas. When a potential of suitable amplitude and frequency is applied, the gas is fired and electrical wall charges are generated which permit the glow to be sustained by a sustaining potential of smaller amplitude than the original firing potential. It is known that devices of this type generate ultraviolet light. However, up to the present time, it has not been known that this characteristic could be embodied in a useful device or system.

SUMMARY OF THE INVENTION

A system embodying the invention includes two or more gas-filled cells of the type described above which are coupled together so that ultraviolet light which is generated by one, can be used to assist in the firing of the other.

DESCRIPTION OF THE PREFERRED EMBODIMENTS

Figure 1:
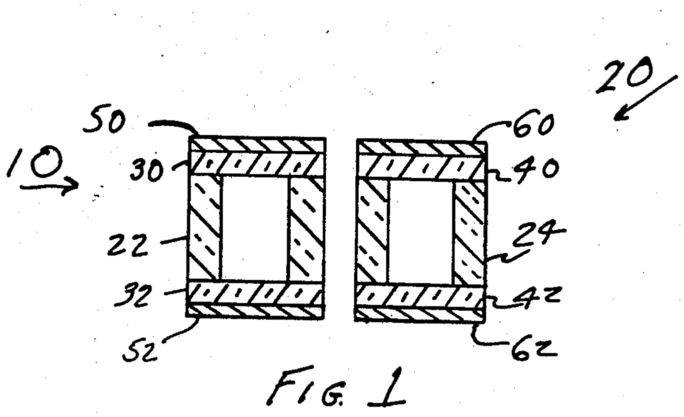
FIG. 1 is a sectional elevational view of two cells embodying the invention.
Figure 2:
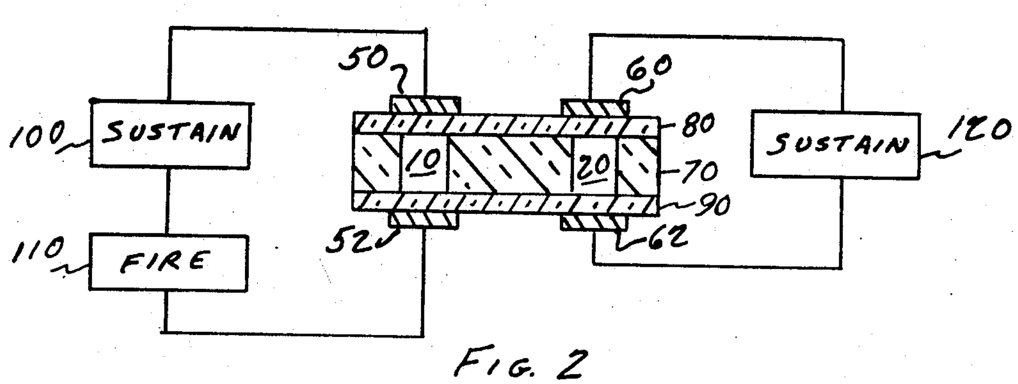
FIG. 2 is a sectional elevational view of the cells of FIG. 1 in another configuration and a schematic representation of a circuit for use therewith.

The principles of the invention are illustrated with reference to a system of the type shown in FIG. 1 which includes two gas-filled cells 10 and 20 formed of insulating material such as glass and including hollow cylindrical envelopes 22 and 24 having glass end walls 30, 32 and 40, 42, respectively, which form a gas-tight seal therewith. Electrodes 50, 52 and 60, 62 are provided on the end walls of cells 10 and 20, respectively. It is clear that the cells 10 and 20 may be separate and distinct as shown in FIG. 1 and positioned close together in accordance with the principles of the invention to be described, or they may be formed in a unitary panel structure (FIG. 2) and made up of an apertured central glass plate 70 and top and bottom glass plates 80 and 90, to which the electrodes 50, 52 and 60, 62 are properly secured. Cells 10 and 20 are preferably just a few thousandths of an inch apart in spacing.

The cells 10 and 20 include an ionizable gas which can be fired and caused to glow and can maintain the glow when a suitable sustaining signal is applied to it. Suitable gases are argon, neon, krypton, nitrogen, helium, etc., or mixtures of these gases. Mixtures of neon and nitrogen are suitable, and a mixture of 93% neon and 7% nitrogen is especially useful. The gas may be introduced into the cell in any well known fashion, and the operating pressure is a few hundred mm. Hg.

A typical circuit for operating cells 10 and 20 includes, in series, a source 100 of sustaining potential and a source 110 of firing pulses connected between electrodes 50 and 52 of cell 10 and a source of sustaining potential 120 between electrodes 60 and 62 of cell 20. Operating parameters are determined generally by the size of the cell, the gas content, and the like, and, for a cell having a thickness of a few mils and with a neon-nitrogen gas mixture, the sustaining potential produced by source 100 is an alternating signal of about 700 volts and a frequency of about 500 kc., and the firing signal produced by source 110 is a pulse of about $\pm 100$ volts. Source 120 may be an A.C. potential of about 700 volts at a frequency of about 500 kc.

In one mode of operation of the cell pair, both cells 10 and 20 have sustaining potential applied to them, and cell 10 is fired by the application of a firing pulse. The firing of cell 10 generates ultraviolet light which is coupled through the surrounding medium to cell 20 in which photoelectrons are generated. This generation of photoelectrons combined with the electric field across cell 20 causes cell 20 to fire and glow. This combination of operations can represent the registering of electrical intelligence in accordance with a predetermined program.

It is clear that more than two cells might be coupled together in a system embodying the invention and various logic functions might be performed therewith.

What is claimed is:

1. A display panel and system comprising:
a central insulating sheet having a plurality of gas-filled cells and having top and bottom surfaces, said cells being spaced apart and separated from each other by thin walls, each cell having a characteristic normal firing voltage,
a first glass plate sealed to the top surface of said central sheet,
a second insulating plate sealed to the bottom surface of said central sheet,
a pair of electrodes in operative relation with each of said cells for applying operating voltages thereto,
said thin walls being of such thickness and said cells being so closely spaced that, when a cell is fired by the application of said characteristic firing voltage, it generates ultraviolet light which enters adjacent cells and generates photoelectrons therein which facilitate the firing thereof at a voltage lower than said characteristic firing voltage.

2. The system defined in claim 1 wherein said cells are spaced apart a few thousandths of an inch.

3. The apparatus defined in claim 1 wherein said pairs of electrodes of each cell are disposed, one member of each pair on said glass plate and the other member of each pair on said second insulating plate.

4. A gas display panel including:
a central insulating sheet having a plurality of gas-filled cells and having top and bottom surfaces,
the gas in said cells being characterized by the emission of ultraviolet radiation when it is caused to glow,
each of said cells being characterized by a normal glow discharge potential in the absence of ultraviolet radiation from any of the other cells, and a reduced glow discharge potential in the presence of such radiation,
a first transparent plate continguous the top surface of said central sheet, a second insulating plate contiguous the bottom surface of said central sheet, a pair of electrodes in operative relation with each of said cells for applying operating voltages thereto, means for selectively energizing at least a first one of said cells by a voltage greater than said normal glow discharge potential, said first cell, when it glows, emitting ultraviolet radiation to at least one other cell, means for energizing said one other cell with a potential at least equal to said reduced glow discharge potential, but less than said normal discharge potential, for producing a glow discharge in said one other cell only if said first cell is glowing.

5. The system defined in claim 1 and including a first electrical signal source connected to the pair of electrodes associated with one cell and a second electrical signal source connected to the pair of electrodes associated with the other cell, said first electrical source including means for firing said one cell and thereby generating ultraviolet light, said second signal source including other means for firing the other cell when it receives ultraviolet light from said one cell.

6. The system defined in claim 3 wherein said first source includes a source of a firing signal and a sustaining signal and said second source includes a source of a sustaining signal.

References Cited

UNITED STATES PATENTS

| | | | |
|---|---|---|---|
| 2,025,912 | 12/1935 | Swart | 315—150 X |
| 2,923,853 | 2/1960 | Engelbart | 315—150 X |
| 2,053,507 | 9/1936 | Barclay | 313—1 |
| 2,644,113 | 6/1953 | Etzkorn | 315—228 |
| 3,157,823 | 11/1964 | Clapp | 315—228 X |

RAYMOND F. HOSSFELD, Primary Examiner

U.S. Cl. X.R.

313—1; 315—151, 169